J. D. CALDWELL.
TRACTOR ATTACHMENT FOR AUTOMOBILES.
APPLICATION FILED JUNE 25, 1919.
1,389,576.
Patented Sept. 6, 1921.
3 SHEETS—SHEET 1.
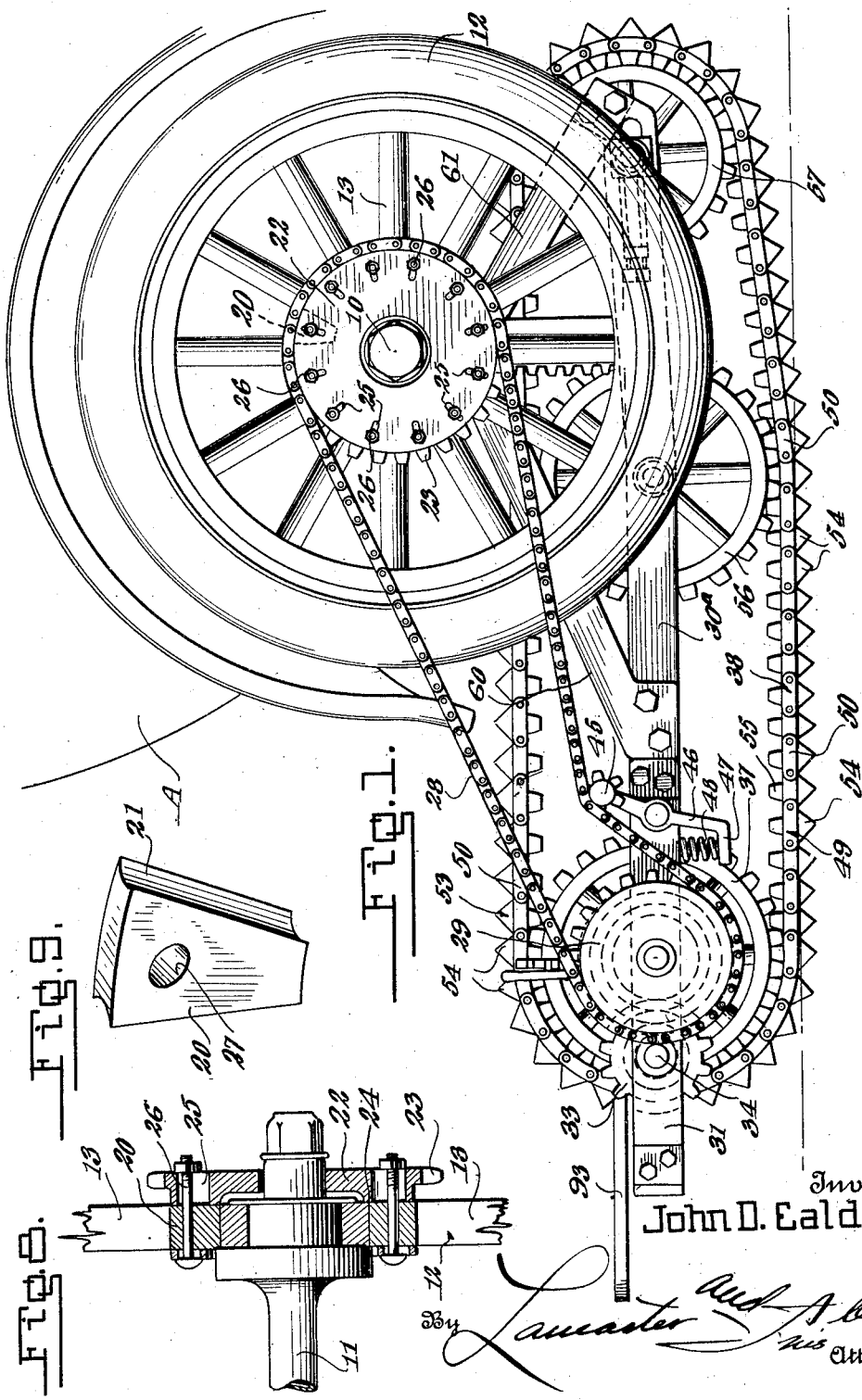
Inventor
John D. Caldwell

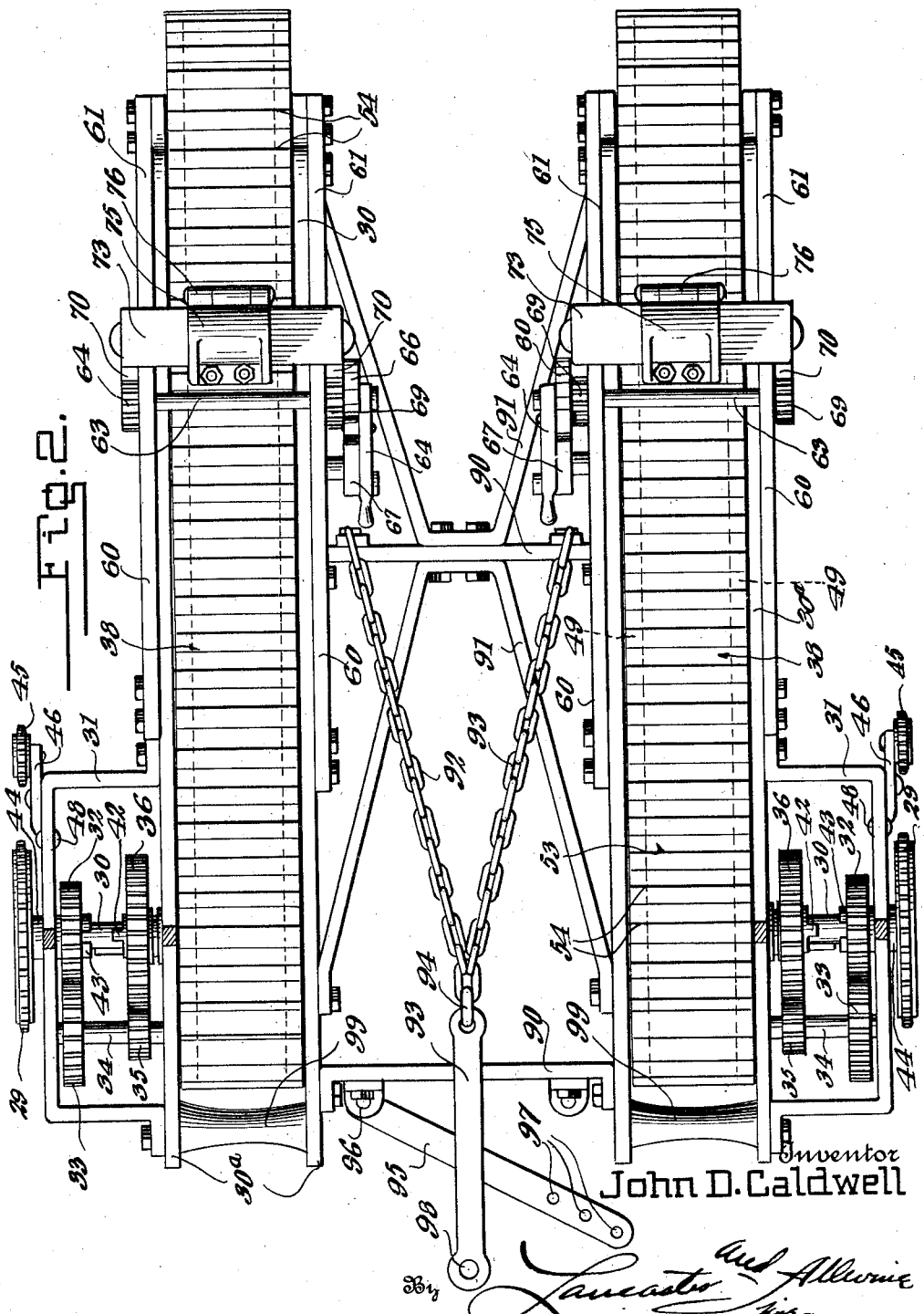

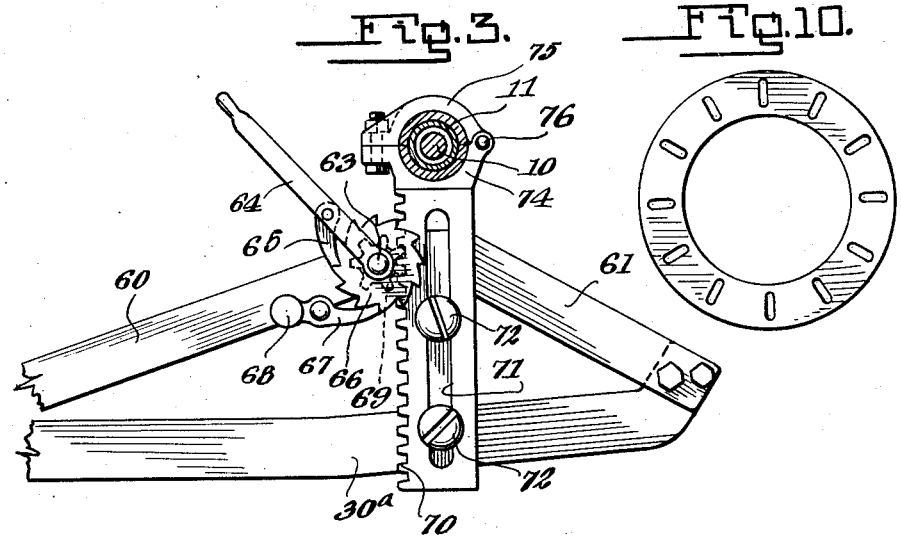
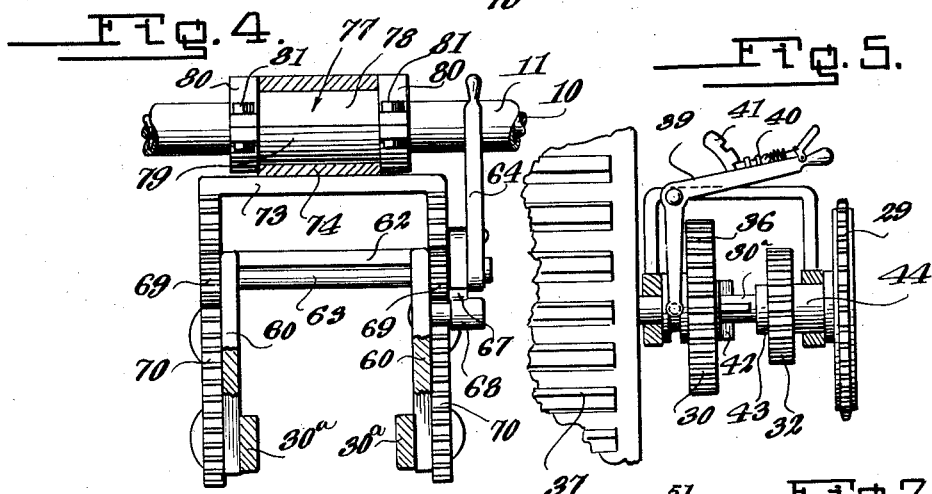
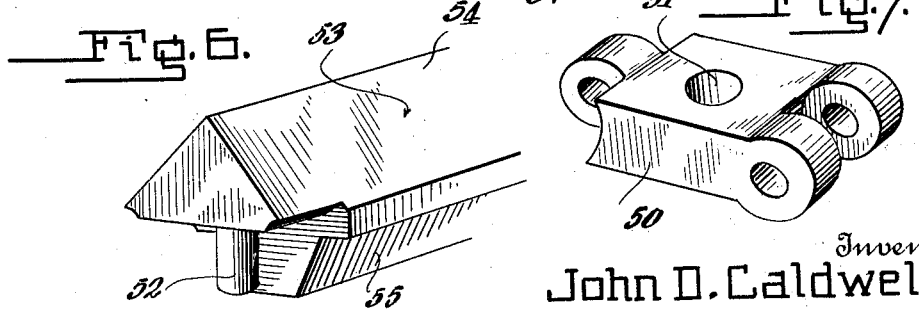

UNITED STATES PATENT OFFICE.

JOHN D. CALDWELL, OF FORSYTH, MONTANA.

TRACTOR ATTACHMENT FOR AUTOMOBILES.

1,389,576.        Specification of Letters Patent.      Patented Sept. 6, 1921.

Application filed June 25, 1919. Serial No. 306,536.

*To all whom it may concern:*

Be it known that I, JOHN D. CALDWELL, a citizen of the United States, residing at Forsyth, in the county of Rosebud and State of Montana, have invented certain new and useful Improvements in Tractor Attachments for Automobiles, of which the following is a specification.

This invention relates to a tractor attachment for automobiles, and an object of the invention is to provide a tractor attachment of the track laying type which may be readily and conveniently attached to automobiles of any approved type, for converting them into tractors or motor vehicles for performing heavy duties, such as the work performed upon a farm, or in marketing the produce from agricultural pursuits.

Another object of the invention is to provide a tractor attachment of the track laying type which is connected directly to the rear wheels of an automobile, to be driven thereby and which employs in its construction, speed change gears, to permit the direct transmission of the power from the wheels of the motor vehicle to the track laying sprockets or gears of the tractor attachment, for relatively fast travel of the vehicle or to permit the transmission of the power from the wheels to the gears of the tractor attachment at a reduced rate of speed for increasing the power thereof, such as is necessary when breaking the land or turning it in the initial preparation of the seed bed, or in harvesting or any of the other operations necessary in properly raising and marketing the agricultural products which require heavy power.

A further object of the invention is to provide a tractor attachment as specified which includes means for elevating the rear end of an automobile to support the rear traction wheels thereof out of engagement with the surface over which the vehicle is traveling, the surface contact being maintained through a track laying structure having suitable chains or grouters upon its surface engaging portion to provide firm tractive engagement with the ground, and also to extend the cleats or grouters upwardly above the upper surfaces of the lower runs of the links of the chains of the track laying structure and to shape them for meshing with the teeth of the operating gears of the track laying surface contact structure.

Other objects of the invention are to provide means for connecting the drive sprockets of the tractor attachment to the wheels of the vehicle in such manner as to equally distribute the strain throughout the spokes of the wheel so as to prevent the transmission of excessive strain to any portion of the wheels of the automobile; to provide spring actuated idlers to mantain the driving sprocket chains taut at all times to maintain proper driving relation between the driving sprockets of the tractor attachment and the driving sprockets carried by the rear wheels of the automobile; and to provide a tractor attachment as specified, which may be readily and conveniently attached to automobiles of approved types and will transmit the power of the automobile to the track laying structure in such manner as to permit utilization of the maximum power of the automobile for drawing any implement or conveyance which is attached to the draw bar of the tractor attachment, the said draw bar being arranged to transmit the pull to the tractor attachment in such manner as to maintain proper engagement between the grouters or cleats of the tractor attachment with the surface over which they are traveling.

Other objects of the invention will appear in the following detailed description taken in connection with the accompanying drawings forming a part of this specification and in which drawings:

Figure 1 is a side elevation of the improved tractor attachment showing the same applied to the rear of an ordinary automobile.

Fig. 2 is a top plan of the tractor attachment.

Fig. 3 is a detail section through the tractor attachment illustrating the connection between the tractor attachment and the rear axle of the automobile.

Fig. 4 is a fragmentary section through the structure illustrated in Fig. 3 and taken at right angles to the Fig. 3.

Fig. 5 is a fragmentary view of the tractor illustrating the speed-change transmission gears.

Fig. 6 is a fragmentary perspective view of one of the combined grouters and gear teeth of the tracks of the track laying tractor attachment.

Fig. 7 is a detail perspective view of one of the links of the chain of the tracks of the tractor attachment.

Fig. 8 is a detail sectional view illustrating the manner of connecting the driving sprocket of the tractor attachment to one of the wheels of the vehicle, and Fig. 9 is a detail perspective view of one of the blocks placed between the spokes of the rear tractive wheels of an automobile to permit connection of the driving sprocket therewith and also to facilitate the equal distribution of strain upon the automobile wheels.

Fig. 10 is a detail side elevation of a washer used in connecting the driving sprocket to one of the drive wheels of a motor vehicle.

Referring more particularly to the drawings, wherein like characters indicate like and corresponding parts, A indicates a motor vehicle or automobile, preferably of the pleasure type. However, it is to be understood that the attachment may be attached to any desired type of motor vehicle, without departing from the spirit of this invention. The motor vehicle A comprises the usual rear axle 10, inclosed in the housing 11 upon the spindles of which rear axles the usual type of drive wheels 12 are mounted. These wheels, as is ordinary in their construction, include a plurality of radiating spokes 13, and in attaching the improved tractor structure to the automobile A, wedge shaped blocks 20, the side edges of which are concavely cut as shown at 21, are placed between the spokes 13 of the rear drive wheel 12 of the motor vehicle adjacent the hub of the wheels, forming supports for the spokes and also means whereby the drive sprockets 22 of the tractor attachment may be applied for connection to the wheels 12. The drive sprockets 22 have the usual peripheral teeth 23 upon their periphery and they are provided with laterally extending annular flanges 24 which abut against the outer surfaces of the wedge shaped blocks 20 and the spokes 13 as clearly shown in Fig. 8 of the drawings. The sprockets 22 are provided with a plurality of circumferentially spaced slots 25 adjacent their peripheries through which bolts 26 extend. The bolts 26 also extend through openings 27 formed in the wedge block 20 for securely connecting the sprockets 22 to the drive wheels 12 of the motor vehicle A. Sprocket chains 28 travel about the sprockets 22, and about sprockets 29 which are mounted upon the drive shaft 30 of the tractor attachment.

The tractor attachment is constructed of substantially two similar portions, one at each side, and one of which is connected with each of the drive wheels 12 of the motor vehicle A and owing to the similarity of these two structures of the tractor attachment only one of them will be hereinafter referred to in the specific description thereof.

The shaft 30 is rotatably supported by a transverse supporting frame structure 31 which projects laterally from the main supporting frame 30ª of the tractor attachment and it has a gear wheel 32 keyed thereon. This gear 32 meshes with the gear 33 carried by a counter shaft 34 which is also rotatably supported by the frame 31. A relatively small gear 35 is keyed upon the counter shaft 34 and meshes with a relatively large gear 36 which is feathered upon the shaft 30. The shaft 30 carries the drive gear 37, which drives the track chain structure 38 of the tractor attachment. The gear 36 is feathered and shiftable and has a lever 39 connected thereto, which carries the usual type of dog mechanism 40 for coaction with the rack 41. The rack 41 is preferably provided with notches to receive the dog mechanism to hold the lever 39 and shiftable gear 36 in adjusted position. The gear 36 carries a clutch section 42 upon its outer side which is adapted to inter-engage with the clutch section 43 formed upon the inner side of the gear 32. When the lever 39 is operated to shift the gear 36 outwardly to move the clutch section 42 into meshing engagement with the clutch section 43, the shaft 30 will be connected with the sprocket 29 direct through this clutch structure for transmitting direct power, and relatively high speed from the rear drive wheel 12 of the automobile to the driving gear 37 of the tractor attachment. However, when heavy work or duty is to be performed by the tractor attachment, the gear 36 is shifted inwardly so that it will mesh with the pinion 35, and the power will be transmitted to the shaft 30 from the wheel 12 by passing through the sprocket 29, gears 32 and 33, shaft 34, pinions 35 and gears 36, thereby reducing the speed of rotation of the gears 37, with respect to the speed of rotation of the wheels 12. By particular reference to Fig. 2 of the drawings, it will be noted that the gears 32 and sprockets 29 are carried by a sleeve 44 which is mounted upon the shaft 30 for independent rotation relative thereto.

A tensioning or idler sprocket 45 is carried by a pivotally mounted arm 46, which is carried by the frame 31 and has its lower end angled as shown at 47, against which angled end an expanding spiral spring 48 engages. The spring 48 urges the sprocket 45 into tensioning engagement with the sprocket chain 28 to hold the latter taut and maintain the proper driving connection between the sprocket 22 and sprocket 29.

The track structure 38 of the tractor attachment comprises chains 49, made up of a plurality of pivotally connected links 50. These links are provided with flat portions having openings 51 extending therethrough through which openings the pins 52 upon the cleat structures 53 are inserted. The pins 52 after being inserted through the openings 51 are offset or riveted to securely connect the cleats 53 to the spaced chain 49.

The outer grouter portions 54 of the cleats 53 are substantially triangular in shape presenting their apexes outwardly, thereby forming substantially wedge-shaped grouters for embedding into the surface over which the tractor attachment is traveling for increasing the tractive power thereof and enabling the tractor to travel over practically any surface and exert the maximum draft power by the automobile A to the article being drawn by the tractor. The cleats 53 are also provided with inwardly extending portions 55 which are shaped to form gear teeth adapted for meshing with the teeth of the drive gears 37 for propelling the track structure 38 by the rotation of the gear 37. Suitable guiding gears 56 and 57 are provided for guiding the movement of the track structure 38 and it will be noted that the forward gear 57 is smaller in diameter than the gears 37 and 56, and that from the gear 56 the track structure travels upwardly to the gear 57, causing it to be gradually moved into engagement with the surface over which the tractor is traveling. Any tendency of the weight of the rear end of the automobile to lower the front gear 57 will be overcome by the drag or draft of the device connected to the tractor attachment in connection with the increased weight of the rear end of the tractor attachment with respect to the weight of its forward end.

The drive wheels 12 of the automobile A are supported in elevated position to prevent engagement thereof with the surface over which the automobile is traveling by the supporting structure clearly illustrated in Figs. 3 and 4 of the drawings. This elevating and supporting structure includes a pair of upwardly inclining braces 60 and 61 which are attached to the supporting frame 30ᵃ and have their upper ends connected. As shown in Fig. 4 of the drawings a pair of each of these braces are provided, the upper ends of which are connected as shown at 62. A rod 63 is supported by the upper ends of the braces 60 and it has a lever 64 mounted thereon which carries a pawl 65. The pawl 65 is provided for engagement with any one of the peripheral teeth of a ratchet 66 carried by the rod 63, and a second pawl 67 is carried by one of the braces 60 and also engages with the teeth of the ratchet 66. This pawl 67 has one end weighted as shown at 68 to maintain it in engagement with the teeth of the ratchet, in such manner as to prevent backward movement of the ratchet but to permit rotation of the ratchet under pivotal movement of the lever 64 transmitted to the ratchet 66 through the pawl 65. The rod or shaft 63 has pinions 69 mounted thereon which mesh with vertical racks 70. These racks 70 are provided with longitudinally extending slots 71 through which suitable bolts 72 engage for supporting the racks and guiding their movements. The upper ends of the racks 70 are connected by a cross bar 73, and they support thereon the clamping structure by means of which the racks are connected to the rear axle 10 and its housing 11. This clamp structure comprises a section 74 which is rigidly connected to the cross bar 73 and a section 75 hingedly connected as shown at 76 to the section 74. These sections 74 and 75 are provided with semi-circular openings which receive therein the collar structure 77. This collar or bearing structure 77 is composed of sections 78 and 79 having annular flanges 80 upon their ends, and these annular flanges 80 are connected by means of bolts 81 to securely clamp the collar sections 78 and 79 upon the housing 11. The flanges 80 engage against the ends of the hinged sections 74 and 75 and prevent longitudinal movement of the collar structure 77 with respect to these sections, but they rotatably engage in the hinged sections to permit pivoted movement of the frame 30ᵃ of the tractor structure with respect to the rear axle structure of the automobile A.

The frames 30ᵃ of each of the track structures are connected by suitable cross braces 90 and braced by substantially U-shaped braces 91. The forward or centrally disposed cross brace 90 has chains 92 and 93 connected thereto, the rear ends of which converge and have a draft bar 93' connected thereto by means of which any desired implements or conveyance may be hitched to the tractor structure. The draft bar 93' is preferably connected by means of a hook 94 to the chains 92 and 93. A second draft bar 95 is pivotally connected as shown at 96 to the rear cross bar 90 and is provided with a plurality of longitudinally spaced openings 97 to permit the connection of implements thereto. However, if it is so desired, the rear perforated ends of the draft or draw bar 93' may be swung laterally and connected to the draw bar 95 through the medium of one of the openings 97 to provide a laterally offset pin or connection between the implement and the tractor attachment. When the draw bars 93' and 95 are connected, it may be desirable to put the hook in one of the forward links in either the chain 92 or 93 to properly compensate for the offsetting laterally of the bar 93'.

The side rails of the frame 30ᵃ are braced at their rear ends and held in proper spaced relation by suitable sleeves 99.

Changes in details may be made without departing from the spirit of this invention, but;

I claim:

1. In a tractor attachment for automobiles, the combination with the rear drive wheels of an automobile, of a supporting structure, means on said supporting structure for adjustably supporting said rear wheels in an elevated position, a pair of endless tracks, means connecting said endless tracks to said wheels for driving the tracks from the wheels, and speed change gears in said driving connecting means.

2. In a tractor attachment for motor vehicles, the combination of an endless track comprising a plurality of pivotally connected links, and a plurality of cleats, the links of said chains provided with openings therethrough, the cleats having reduced extended portions for overlapping the links, and pins formed upon the ends of said cleats extending through said openings and having their projected ends upset for securely connecting the cleats to said chains.

3. In a tractor attachment for automobiles, the combination of an endless track comprising a plurality of links and cleats, the links provided with openings therethrough, the cleats including transversely extending bodies, the ends of the bodies being notched to receive said links, pins upon the notched ends of said cleats extending through said openings and having their projected ends upset for securely connecting the cleats to said links, the portions of said cleats outwardly of said links, being substantially triangular shaped in cross section.

4. In a tractor attachment, the combination of a supporting structure, a driving gear upon said supporting structure, an endless track comprising a pair of chains, each composed of a plurality of links, cleats extending transversely across the chains and connected to said links, the cleats including bodies having the outer sides thereof triangular shaped in cross section, the inner sides of said bodies at the ends thereof being notched for the reception of the links, the inner sides of said bodies of said cleats lying between the notched portions being shaped to form teeth for meshing with the teeth of said gears.

5. In a tractor attachment for automobiles, the combination of a supporting frame, an endless track carried by said supporting frame, drive means for driving said endless track, a driving sprocket, and speed change gears operatively connecting said driving sprocket and driving gear.

6. In a tractor attachment, the combination of a supporting frame, a drive gear rotatably carried by said supporting frame, guiding gears carried by said supporting frame, an endless track traveling over said drive and guiding gears, a driving sprocket, speed change gears operatively connecting said sprocket and drive gears, said endless track having means for engaging the teeth of said drive and guiding gears to drive the endless track by rotation of the drive gears.

7. In a tractor attachment for automobiles, the combination with the rear drive wheels of an automobile, of a supporting structure, means on said supporting structure for adjustably supporting said rear wheels in an elevated position, a pair of endless tracks carried by said supporting frame, driving sprockets for said tracks, a plurality of wedge shaped blocks positioned between the spokes of said wheels, a sprocket connected to said blocks, sprocket chains traveling about said wheel carried sprocket and said driving sprocket for driving the endless track by rotation of the rear drive wheels.

8. In a tractor attachment for automobiles, the combination, with the rear drive wheels of an automobile, of a supporting structure, means on said supporting structure for adjustably supporting the rear wheels in an elevated position, a pair of endless tracks, drive gears for said tracks carried by said supporting structure, drive sprockets, speed change gears operatively connecting said drive sprockets and said drive gears, sprockets detachably carried by the rear wheels of the automobile, and sprocket chains connecting said wheel carried and said driving sprockets.

9. In a tractor attachment, with the rear drive wheels of an automobile, of a supporting structure, means on said supporting structure for adjustably supporting the rear wheels in an elevated position, a pair of endless tracks, drive gears for said tracks carried by said supporting structure, drive sprockets, speed change gears operatively connecting said drive sprockets and said drive gears, sprockets detachably carried by the rear wheels of the automobile, sprocket chains connecting said wheel carried and said driving sprockets, said endless tracks comprising chains, cleats carried by said chain and comprising outwardly extending grouter portions and inwardly extending tooth portions adapted for meshing with the teeth of said driving gear for operating the endless tracks.

10. In a tractor attachment for automobiles, the combination with the rear drive axle and wheels of an automobile, of a supporting structure, vertically movable bars carried by said supporting structure, clamps carried by the upper ends of said bars, collars rotatably engaged in said clamp and adapted for clamping engagement upon the rear side axle of a vehicle, rack teeth along the rear edges of said vertically movable bars, a pivoted lever, pinions connected to said lever and meshing with said rack teeth for raising or lowering said bars upon rocking movement of the lever, and means for preventing backward movement of the lever.

JOHN D. CALDWELL.